(12) United States Patent
Wilburn et al.

(10) Patent No.: US 9,100,581 B2
(45) Date of Patent: Aug. 4, 2015

(54) TIME INTERLEAVED EXPOSURES AND MULTIPLEXED ILLUMINATION

(75) Inventors: Bennett S. Wilburn, Beijing (CN); Moshe Benezra, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 708 days.

(21) Appl. No.: 12/827,452

(22) Filed: Jun. 30, 2010

(65) Prior Publication Data

US 2011/0242334 A1 Oct. 6, 2011

Related U.S. Application Data

(60) Provisional application No. 61/320,473, filed on Apr. 2, 2010.

(51) Int. Cl.
*H04N 5/225* (2006.01)
*H04N 5/235* (2006.01)
*H04N 5/272* (2006.01)
*H04N 5/3745* (2011.01)
*H04N 9/75* (2006.01)

(52) U.S. Cl.
CPC .............. *H04N 5/2354* (2013.01); *H04N 5/272* (2013.01); *H04N 5/37452* (2013.01); *H04N 9/75* (2013.01)

(58) Field of Classification Search
CPC ........................... G06K 9/2018; H04N 5/2354
USPC ........... 348/207.1, 224.1, 258, 259, 261, 587, 348/586, 46
See application file for complete search history.

(56) References Cited

U.S. PATENT DOCUMENTS

| | | |
|---|---|---|
| 3,971,065 A | 7/1976 | Bayer |
| 6,744,471 B1 | 6/2004 | Kakinuma et al. |
| 7,042,505 B1 | 5/2006 | DeLuca |
| 7,400,431 B2 | 7/2008 | Schwerdtner et al. |
| 7,606,417 B2 | 10/2009 | Steinberg et al. |
| 2006/0008171 A1* | 1/2006 | Petschnigg et al. ........... 382/254 |
| 2006/0139470 A1 | 6/2006 | McGowan |
| 2006/0204040 A1 | 9/2006 | Freeman et al. |
| 2007/0024742 A1 | 2/2007 | Raskar et al. |
| 2007/0263119 A1* | 11/2007 | Shum et al. .................... 348/371 |
| 2011/0052082 A1* | 3/2011 | Parkov et al. ................. 382/209 |

OTHER PUBLICATIONS

Canesta 101 "Introduction to 3D Vision in CMOS", Canesta, Inc., Mar. 2008, 20 pages.
Ahmed, "High Quality Dynamic Reflectance and Surface Reconstruction from Video", retrieved on Feb. 23, 2010 at <<http://www.mpi-inf.mpg.de/~nahmed/Dissertation.pdf>>, Doctoral Dissertation, University of Saarlandes, Germany, 2009, pp. 1-145.

(Continued)

*Primary Examiner* — Joel Fosselman
(74) *Attorney, Agent, or Firm* — Judy Yee; Micky Minhas; Lee & Hayes, PLLC

(57) ABSTRACT

Samples of a scene are acquired in synchronization with finely interleaved varying conditions such as lighting, aperture, focal length, and so forth. A time-varying sample at each pixel for each condition is reconstructed. Time multiplexed interleaving allows for real-time, live applications, while handling motion blur naturally. Effects such as real-time video relighting of a scene is possible. Time interleaved exposures also allow segmentation of a scene, and allows for constrained special effects such as triangulation matting using a multi-color interleaved chroma key.

21 Claims, 15 Drawing Sheets

(56) References Cited

OTHER PUBLICATIONS

De Decker, Kautz, Mertens, Bekaert, "Capturing Multiple Illumination Conditions using Time and Color Multiplexing", retrieved on Feb. 23, 2010 at <<http://web4.cs.ucl.ac.uk/staff/j.kautz/publications/Mux_CVPRO9.pdf>>, IEEE Computer Society, Conference on Computer Vision and Pattern Recognition, Jun. 20, 2009, pp. 1-8.

Eisemann, Durand, "Flash Photography Enhancement via Intrinsic Relighting", retrieved on Feb. 23, 2010 at <<http://people.csail.mit.edu/fredo/PUBLI/flash/flash.pdf>>, ACM Transactions on Graphics (TOG), Aug. 2004, pp. 673-678.

Hernandez, Vogiatzis, Brostow, Stenger, Cipolla, "Non-rigid Photometric Stereo with Colored Lights", retrieved on Feb. 23, 2010 at <<http://mi.eng.cam.ac.uk/research/projects/VideoNormals/NonRigidPhotometricStereoWithColoredLights_iccv2007.pdf>>, Proceedings of ICCV, 2007, pp. 1-8.

Kanade, "CMU Image Understanding Program", retrieved on Feb. 23, 2010 at <<http://www.ri.cmu.edu/pub_files/pub3/kanade_takeo_1992_3/kanade_takeo_1992_3.pdf>>, Proceedings of Image Understanding Workshop, Jan. 26, 1992, pp. 51-62.

Malzbender, Gelb, Wolters, "Polynomial Texture Maps", retrieved on Feb. 23, 2010 at <<http://www.hpl.hp.com/research/ptm/papers/ptm.pdf>>, ACM, Proceedings of Conference on Computer Graphics and Interactive Techniques, 2001, pp. 519-528.

Malzbender, Wilburn, Gelb, Ambrisco, "Surface Enhancement Using Real-time Photometric Stereo and Reflectance Transformation", retrieved on Feb. 23, 2010 at <<http://www.hpl.hp.com/personal/Tom_Malzbender/papers/egrw2006.pdf>>, Proceedings of the European Symposium on Rendering, Jun. 2006, pp. 245-250.

Narasimhan, Koppal, Yamazaki, "Temporal Dithering of Illumination for Fast Active Vision", retrieved on Feb. 23, 2010 at <<http://www.ri.cmu.edu/pub_files/2008/10/eccv.pdf>>, Springer Berlin, Computer Vision—ECCV 2008, vol. 5305/2008, 2008, pp. 830-844.

Petschnigg, Agrawala, Hoppe, Szeliski, Cohen, Toyama, "Digital Photography with Flash and No-Flash Image Pairs", retrieved on Feb. 23, 2010 at <<http://research.microsoft.com/en-us/um/people/hoppe/flash.pdf>>, ACM Transactions on Graphics (TOG), vol. 23, No. 3, 2004, pp. 664-672.

Raskar, Tumblin, Mohan, Agrawal, Li, "Computational Photography", retrieved on Feb. 23, 2010 at <<http://citeseerx.ist.psu.edu/viewdoc/download?doi=10.1.1.81.4790&rep=rep1&type=pdf>>, The Eurographics Association, 2006, pp. 1-16.

Schechner, Nayar, Belhumeur, "A Theory of Multiplexed Illumination", retrieved on Feb. 23, 2010 at <<http://lear.inrialpes.fr/people/triggs/events/iccv03/cdrom/iccv03/0808_schechner.pdf>>, IEEE Computer Society, Proceedings of Conference on Computer Vision (ICCV), vol. 2, 2003, pp. 1-8.

Smith, Blinn, "Blue Screen Matting", retrieved on Feb. 23, 2010 at <<http://citeseerx.ist.psu.edu/viewdoc/download?doi=10.1.1.85.2069&rep=rep1&type=pdf>>, ACM SIGGRAPH, Proceedings of Conference on Computer Graphics and Interactive Techniques, 1996, pp. 259-268.

Sun, Li, Kang, Shum, "Flash Matting", retrieved on Feb. 23, 2010 at <<http://citeseerx.ist.psu.edu/viewdoc/download?doi=10.1.1.117.3875&rep=rep1&type=pdf>>, ACM, Jul. 2006, pp. 772-778.

Vlasic, Peers, Baran, Debevec, Popovic, Rusinkiewicz. Matusik, "Dynamic Shape Capture using Multi-View Photometric Stereo", retrieved on Feb. 23, 2010 at <<http://delivery.acm.org/10.1145/1620000/1618520/a174-vlasic.pdf?key1=1618520&key2=0368296621&coll=GUIDE&dl=GUIDE&CFID=77334450&CFTOKEN=77180834>>, ACM Transactions on Graphics, vol. 28, No. 5, Article 174, Dec. 2009, pp. 174:1-174:11.

Wenger, Gardner, Tchou, Unger, Hawkins, Debevec, "Performance Relighting and Reflectance Transformation with Time-Multiplexed Illumination", retrieved on Feb. 23, 2010 at <<http://gl.ict.usc.edu/Research/LS5/LightStage5_S2005.pdf>>, ACM Transactions on Graphics (TOG), vol. 24, No. 3, Jul. 2005, pp. 756-764.

Woodham, "Photometric method for determining surface orientation from multiple images", retrieved on Feb. 23, 2010 at <<http://www.cs.ubc.ca/~woodham/papers/Woodham80c.pdf>>, Optical Engineering, vol. 19, No. 1, Jan. 1980, pp. 139-144.

\* cited by examiner

TIME INTERLEAVED EXPOSURES AND MULTIPLEXED ILLUMINATION

PRIORITY

The present application claims priority to U.S. Provisional Application Ser. No. 61/320,473, filed on Apr. 2, 2010, entitled "Time Interleaved Exposures and Time Multiplexed Illumination for Multi-Lighting Special Effects." This application is herein incorporated by reference in its entirety, and the benefit of the filing date of this application is claimed to the fullest extent permitted.

BACKGROUND

The production and use of still pictures and video is found in a wide variety of venues ranging from television studios, webcasting, photography, and so forth. However, limitations of current techniques hamper the production of video in many circumstances. In particular, current imaging techniques do not easily tolerate uncontrolled lighting, changes in lighting conditions, and so forth.

To ameliorate these problems, traditional systems may capture multiple images under varying lighting conditions and use these images to generate better quality images. However, this involves complicated lighting, computationally expensive and slow post-capture processing, and other serious drawbacks limiting the traditional situations to highly controlled environments, such as a studio.

Furthermore, special effects such as matting, which composites a live actor in front of a synthesized or previously imaged background elements, have relied upon chroma keying. For reliable performance, individuals and objects present in the foreground must not have colors close to the chroma key. This limits the utility of chroma keying to situations where the environment and the participants are controlled, such as in a studio. Conventional chroma keying requires carefully controlled lighting and backgrounds, also confining its use to the studio.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described herein is an architecture and techniques for rapidly interleaving varying states in an imaging system and sampling image data synchronously with those varying states. A conventional imaging sensor may be used, however performance may be enhanced by using imaging elements with a plurality of charge accumulators. In such a situation, pre-processing of the signal may be done by the chip in an analog domain, allowing for lower data rate output.

The interleaving and corresponding data sampling occurs at a sufficiently high data rate to allow reconstruction of synthetic exposures, without aliasing due to motion blur or changing illumination, using known reconstruction filters (weighted sums of images). An image with desired characteristics is reconstructed from those samples. The varying conditions include illumination, focal length, aperture, and so forth. The reconstructed images may be used in real-time to relight a scene, segment foreground and background objects in the scene, compute an alpha matte and foreground subject colors, and so forth.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
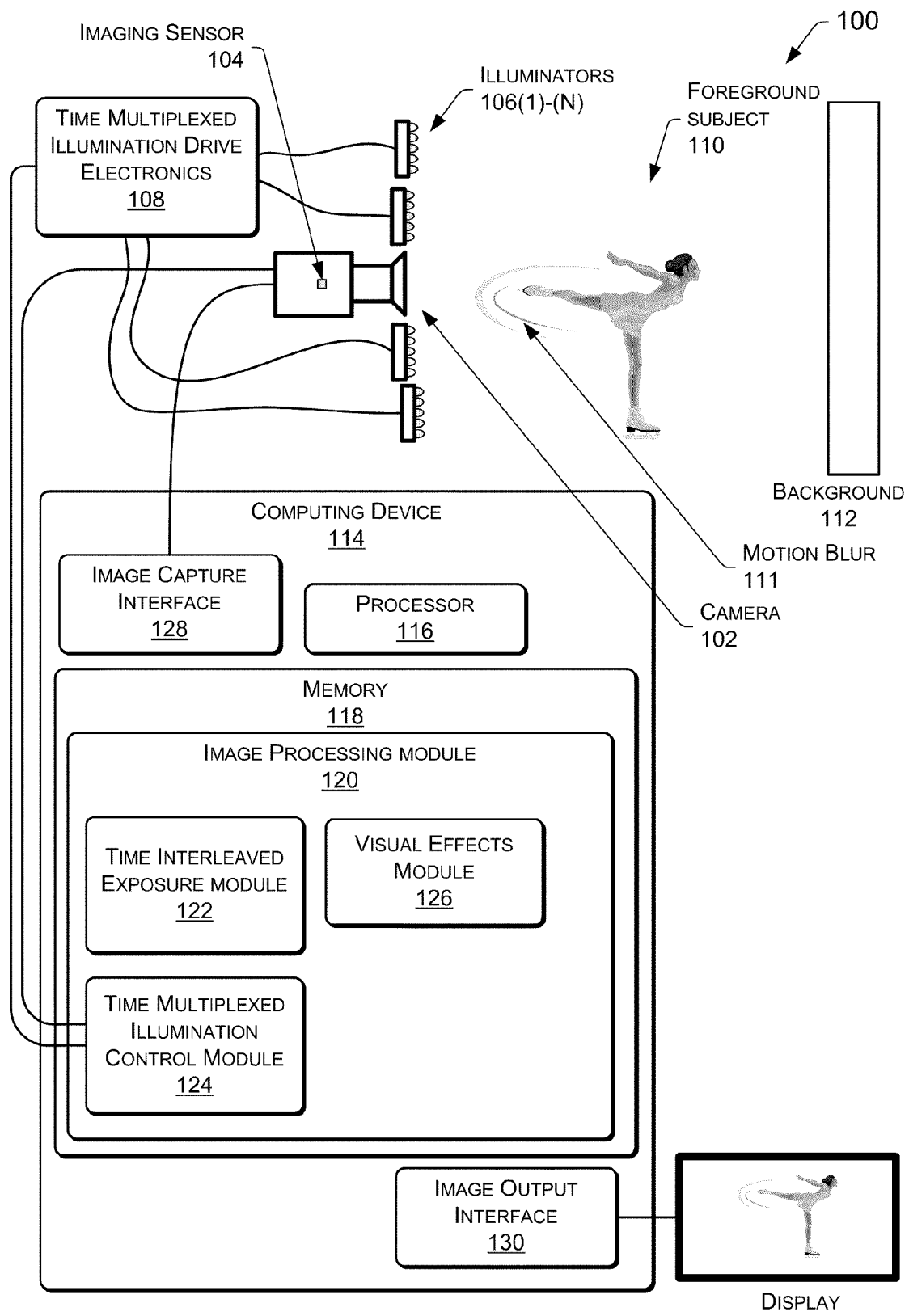
FIG. 1 is an illustrative architecture for time interleaved exposures and time multiplexed illumination.

Described herein are architectures and techniques for rapidly interleaving varying states in an imaging system and sampling image data synchronously with those varying states. In some implementations, the state changes and corresponding sampling rate for each state may exceed 200 times per second.

A conventional imaging sensor may be used. Performance enhancements accrue from imaging elements having a plurality of charge accumulators. For example, where two states are sampled, the imaging element may be configured to store separately an accumulated charge from incident photons during each of the two states. Additionally, in such a situation, some pre-processing of the signal by the imaging sensor in an analog domain allows for lower data rate output from the imaging sensor.

The interleaving and corresponding data sampling occurs at a sufficiently high data rate to allow reconstruction that minimizes aliasing or other artifacts. For example, fluorescent/incandescent lights typically oscillate at twice a power supply frequency (such as 50 Hz abroad). Thus, to prevent aliasing of a reconstructed signal, in the presence of 100 Hz lighting fluctuations two (or more) states are sampled at least at 200 Hz, with higher sampling rates producing better results.

An image with desired characteristics is then reconstructed from the samples. The varying conditions may include illumination, focal length, aperture, and so forth. For example, the varying illumination states may include illuminated/non-illuminated, illuminated with a particular color of light, illuminated from a particular direction, and so forth.

Reconstruction occurs in real-time or near real-time due to recognition of this operation as a sampling problem. Given the high sample rate for each state, a reconstruction filter or other method is able to represent a time-varying signal for a given state. In some implementations, a computationally efficient weighted sum of sample values is used. These weights are known in advance, and thus are computationally feasible and may be performed in real-time. The weights may include nearest neighbor interpolation plus summation for the integral, linear interpolation plus summation, cubic interpolation plus summation, and so forth.

The techniques described herein retain realistic motion blur without requiring motion estimation, further reducing computational demands and possibly reducing artifacts introduced by other techniques such as optical flow. As a result, the system is capable of operation in real-time or near real-time.

A variety of operations either individually or in combination may take place. The reconstructed images may be used in real-time to relight a scene, segment foreground and background objects in the scene, provide for an interleaved chroma key, and so forth.

Scene relighting involves changing the apparent source of illumination present in a scene. Scene relighting may be desired for aesthetic reasons, functional reasons, or to allow for compositing of a plurality of images such that they appear to share a common illumination. For example, a scene of an actor on a set for a news broadcast may be shot using frontal illumination. However, a producer may want to place the actor into a virtual environment in which the illumination appears to come from overhead. Virtual relighting is thus possible. The scene of the actor on the set may be relit as described herein such that it appears that the actor is illuminated from overhead.

Foreground and background object segmentation allows separation of objects based upon their general location relative to a camera. Thus, objects proximate to the camera are in the foreground, while objects distant from the camera are in the background. As disclosed herein, when a generally light background is present, objects may be segmented into foreground and background with a single camera. Once segmented, matting, compositing, and other special effects may be applied.

Chroma keying traditionally uses an object in front of a single known background of a particular color and radiance. The known background color is used as a key to generate a matte, and allows for special effects such compositing the object apparently in front of another scene. The drawback of single color chroma keying is that the foreground must not be the same color or the background, and the scene illumination must well controlled. Triangulation matting uses two different backing colors so the foreground objects such as actors may wear any color clothing, but the objects must be in substantially the same position in both images. Interleaved chroma key as described herein allows for robust triangulation matting meaning foreground objects such as actors may wear any color clothing. Furthermore, interleaved chroma keying is tolerant of illumination changes, and may be implemented against a wide variety of backgrounds. For example, the interleaved chroma key may use different colored lights to illuminate a light colored background such as an office wall, while also tolerating changes in ambient illumination. Thus removing the rigid constraints imposed by traditional chroma keying.

This brief introduction is provided for the reader's convenience and is not intended to limit the scope of the claims, nor the following sections. Furthermore, the techniques described in detail below may be implemented in a number of ways and in a number of contexts. Example implementations and contexts are provided with reference to the following figures, as described below in more detail. However, it is to be appreciated that the following implementations and contexts are but a few of many possible implementations.

Illustrative Architecture

FIG. 1 illustrates an example architecture 100 in which the claimed techniques for time interleaved exposures and time multiplexed illumination may be implemented.

An imaging device, such as a camera 102 contains an imaging sensor 104. The imaging sensor 104 may comprise a charge coupled device (CCD), complementary metal oxide semiconductor (CMOS), or other component configured to provide a signal upon the impingement of incident electromagnetic radiation. While this disclosure discusses applications and implementations in the context of visible light, it is understood that the techniques described herein may be applied to other frequencies of electromagnetic radiation, including ultraviolet, infrared, near-infrared, terahertz, and so forth. The imaging sensor 104 may further comprise conventional or special imaging elements, such as those with multiple charge accumulators described below with regards to FIGS. 2 and 3.

The camera 102 is configured to capture an image or series of images (such as video), of a foreground subject 110 against a background 112. Subjects may move around during imaging. For example, video capture of a figure skating competition involves a series of images of fast-moving people. Due to persistence of vision and psycho visual effects, a human eye perceives fast moving objects as a blur, such as a motion blur 111 of a figure-skater during a rapid spin. Capturing or re-creating this blur is desirable to provide realistic reproduction of the image to a viewer. In contrast, images presented without blur may be unpleasant or result in apparent stroboscopic effects which appear unnatural to viewers. Moreover, many computer vision techniques require images of the same scene, under different conditions, but at the same time. This is difficult if objects in the scene move between images. Traditionally, image motion was analyzed using a computationally and operationally complicated process known as optical flow, which is not conducive to real-time video. With accurate optical flow, one can correct for scene motion in order to analyze images taken under varying conditions, and one can also simulate motion blur to create pleasing video. However, the techniques described herein capture images that appear to be taken under different conditions, but over about the same time interval. They maintain image blurring of fast moving objects in real-time without undue computational or operational complexity in some instances. These images are suitable for many computer vision techniques that work in the presence of motion blur, including relighting and triangulation matting.

As illustrated, the architecture 100 also includes a computing device 114. The computing device 114 comprises a processor 116 and a memory 118. In some implementations, the processor 116 may comprise multiple processors, or "cores." In some implementations, the processor 116 may comprise one or more graphics processing units (GPUs). The processor 116 is configured to execute programmatic instructions which may be stored in the memory 118. The memory 118 may include any computer- or machine-readable storage media, including random access memory (RAM), non-volatile RAM (NVRAM), magnetic memory, optical memory, and so forth. In some implementations the computing device 114 may be a server, desktop, or other computing device configured to perform the techniques described in this disclosure. The computing device 114 and may also include a communication interface such as a network interface.

Within the computing device and coupled to the processor 116 and the memory 118 is an image capture interface 128. The image capture interface 128 couples to and accepts image data from the camera 102 and outputs images suitable for further processing. In some implementations the image capture interface 128 may comprise a frame grabber.

The memory 118 includes an image processing module 120. The image processing module 120 is configured to execute on the processor 116. Within the image processing module 120 is a time interleaved exposure module 122. The time interleaved exposure module 122 is configured to generate exposures of the image reconstructed from image data received from the camera 102.

A time multiplexed illumination control module 124 couples to the time interleaved exposure module 122, time multiplexed illumination drive electronics 108, and the camera 102. The time multiplexed illumination control module 124 generates signals for synchronizing illumination states with image sample acquisition from the camera 102. The signals generated by the time multiplexed illumination control module 124 trigger the time multiplexed illumination drive electronics 108 to activate one or more illuminators 106(1), 106(2), . . . , 106(N) to change state. The illuminators may comprise light emitting diodes (LEDs), spatial light modulators, lights directed by digital light processors, and so forth. The time multiplexed illumination control drive electronics 108 may activate one or more illuminators 106(1) while deactivating other illuminators 106(2)-(N). In this fashion, different illumination states are generated in synchronization with the sampling of the camera 102.

The memory 118 also includes is a visual effects module 126, which provides for special effects such as matting, compositing, and so forth. Matting is the process of isolating specific portions of an image for manipulation. For example, portions of an image associated with the foreground or that do not match a chroma key may be designated. The designated portions, or the inverse of the designated portion, may then be used for other special effects, such as compositing. A composite image incorporates two or more images, typically from different sources, which are combined. For example, a real-time matte of a television weatherman in front of an interleaved chroma key may be determined. By compositing the matte with a graphic of the weather, the weatherman appears to be in front of the graphic.

The visual effects module 126 may also provide for scene relighting. For example, a user may wish to change the direction of apparent lighting from the front to overhead.

A processed image may be output by the computing device 114. As shown, an image output interface 130 in the computing device 114 is coupled to a display 140. The image output interface 130 may comprise a display adapter or other suitable device configured to accept image data and output a signal or data stream compatible with the display 140.

Enhanced Imaging Sensors

While the techniques described herein may use existing conventional imaging sensors, the following enhanced imaging sensors improve performance by enabling shorter interleaving intervals and, in some implementations, pre-processing of image data.

Figure 2:
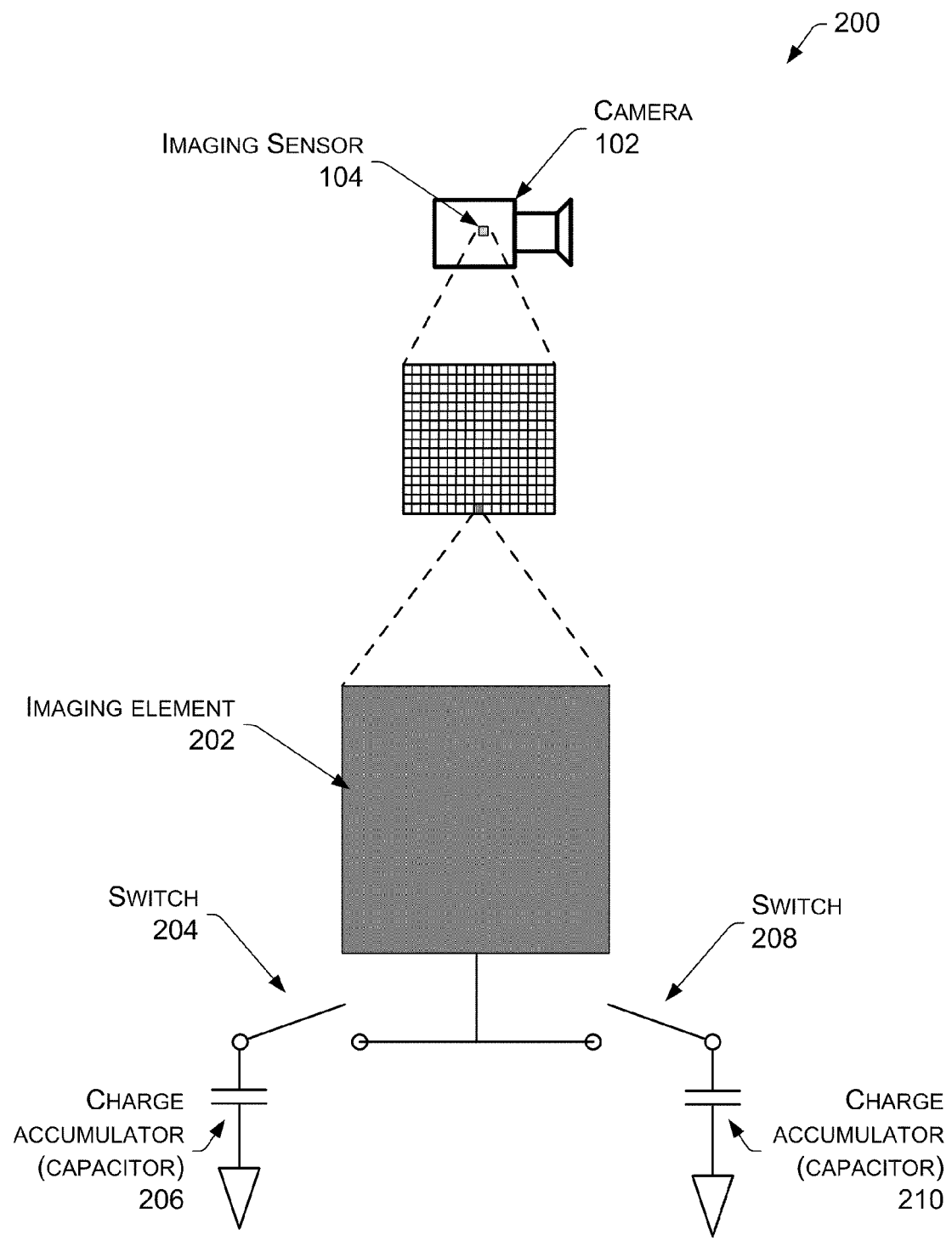
FIG. 2 is a schematic of an enhanced imaging sensor configured such that each imaging element has multiple charge accumulators.

FIG. 2 is a schematic of an enhanced imaging sensor 200. In this schematic, camera 102 contains imaging sensor 104. Imaging sensor 104 contains a plurality of imaging elements 202(1), . . . , 202(E), also known as pixels. Each imaging element 202 may be coupled via switches 204 and 208 to a plurality of charge accumulators 206 or 210 respectively. During operation of the imaging element, incident light generates an electrical signal. This electrical signal may be stored in a charge accumulator or capacitor.

By providing for a plurality of charge accumulators, the charge accumulators may be switched in synchronization with the varying states. For example, a first charge accumulator may be switched to accumulate a charge during a first illumination state, the disconnected and a second charge accumulator is switched to accumulate a charge during a second illumination state. Thus, each accumulator integrates light from a different state.

The charge on the charge accumulators may be read out separately and converted to a digital value at the end of a pre-determined amount of exposure time. During this exposure time, each of the accumulators may have been switched on many times. Enable signals used to trigger the switches 204 and 208 to couple the imaging element 202 to the respective charge accumulators may be generated by the time multiplexed illumination control module 124 or on the imaging sensor 104 for high dynamic range imaging.

The use of multiple charge accumulators allows a decrease in the time required for each sample. As a result, this allows finer interleaving of the varying states. With finer interleaving, operations such as computation of image exposure resemble a simple summation over the interleaved exposures for each state. As a result, the image resulting from these stored accumulated charges is equivalent to having computed the image exposure digitally after reading out each interleaved sample. Pre-processing in the analog domain (e.g. summing charge in separate accumulators) allows the camera 102 to output a lower data rate image stream.

The enhanced image sensor 200 also facilitates work with video of dynamic scenes including image de-noising with flash/no-flash image pairs, flash/no-flash image matting, and multi-flash photography. Furthermore, the enhanced image sensor 200 facilitates high dynamic range (HDR) imaging. In this case, there is no synchronized illumination, and the duty cycle of the capacitors would not be 50%. Integrating a charge on one capacitor for a smaller fraction of the image exposure time allows capture of brighter portions of the scene without saturation.

The enhanced image sensor 200 also accommodates "flutter-shutter" image capture. The flutter shutter technique usually closes the shutter for 50% of the image exposure, thus not measuring half of the light reaching the sensor and lowering the signal-to-noise ratio of the measurement. Using two or more capacitors, it is possible to integrate light by enabling one capacitor or the other. This captures the flutter shutter image and the dual flutter shutter image, which exposes when the first does not. The second image increases the accuracy of the technique.

Figure 3:
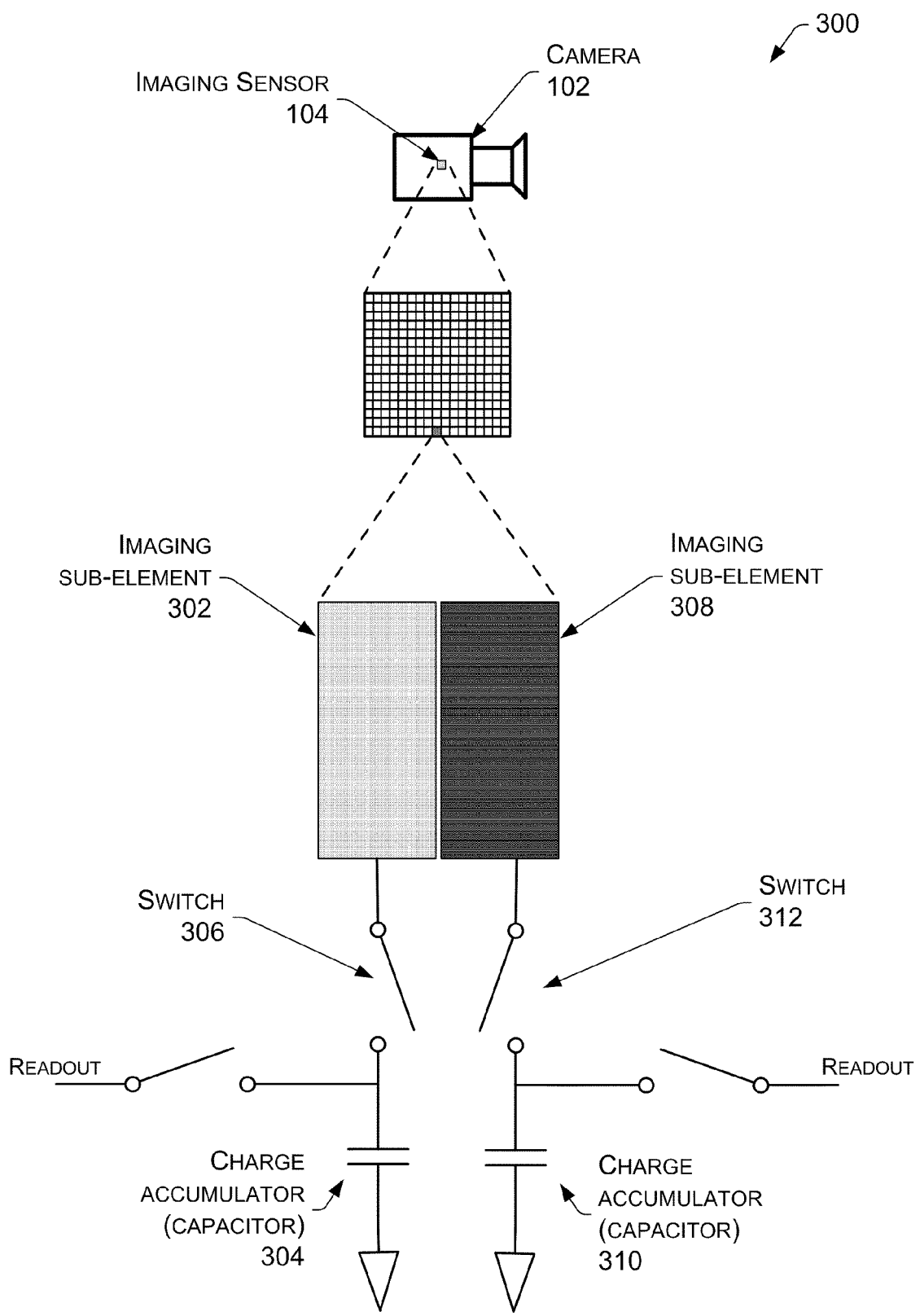
FIG. 3 is a schematic of another implementation of an enhanced imaging sensor configured with a plurality of imaging sub-elements, each having a charge accumulator.

FIG. 3 is a schematic of another implementation of an enhanced imaging sensor 300. In this implementation, each pixel has been split to form two separate imaging sub-elements, each with a dedicated charge accumulator. As shown, an imaging sub-element 302 is connected via a switch 306 to charge accumulator 304. Another imaging sub-element 308 is connected via a switch 312 to charge accumulator 310. As described above with respect to FIG. 2, the imaging sub-elements and associated accumulators may be synchronized with the varying state and read out to provide data for the respective varying states. Additional switches connect the charge accumulation capacitors to readout lines.

Figure 4:
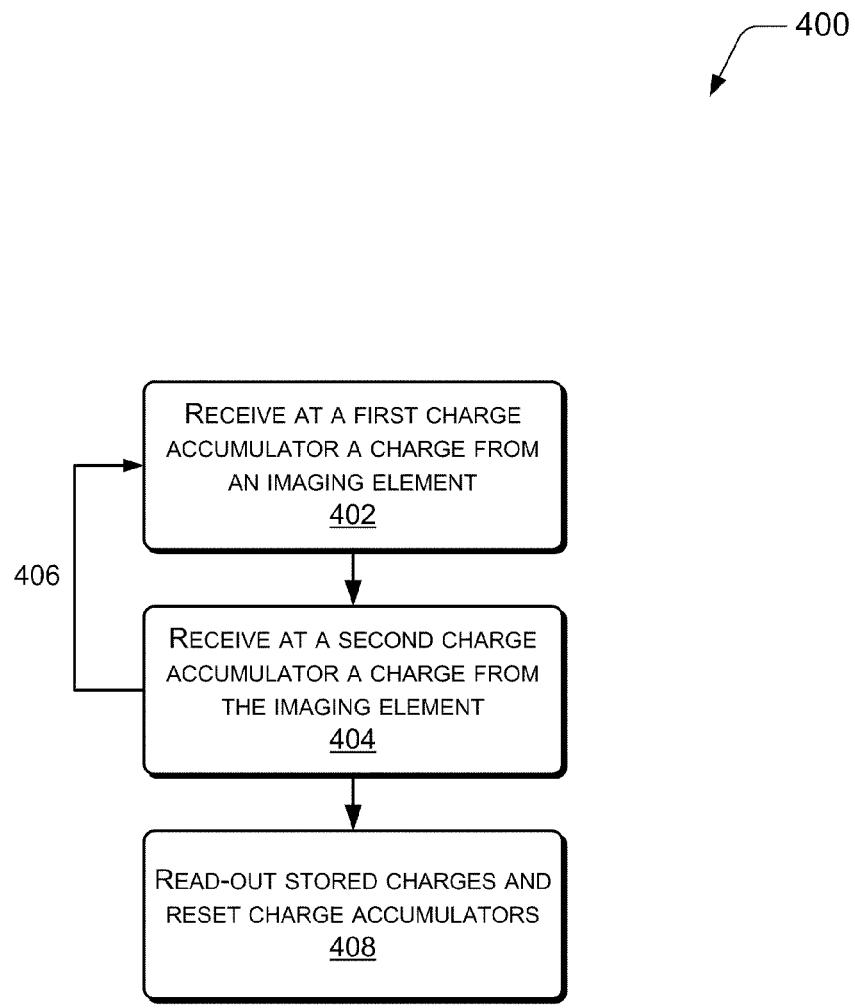
FIG. 4 depicts a flow diagram of an example process of gathering data from the imaging sensor of FIG. 2 or 3.

FIG. 4 depicts a flow diagram of an example process 400 of gathering data from the imaging sensor of FIG. 2 or 3. At 402, a first charge accumulator receives a charge from an imaging element. As described above, the charge may be in response to a specific one of the varying states, such as a particular illumination state. At 404, a second charge accumulator receives a second charge from the same imaging element (as described in FIG. 2) or a separate imaging element (as described in FIG. 3). As above, this charge is in response to another one of the varying states. As shown by arrow 406, the image sensor repeatedly cycles between these states many times, alternating between transferring charge to the first accumulator and the second.

At 408, the stored charges are read-out, and the charge accumulators reset in preparation of storing another charge for another sample. In some implementations, the read-out may also reset the charge accumulators.

The exposure times for each charge accumulator may vary. For example, the first charge accumulator may have an exposure time of 1 millisecond (ms), while the second charge accumulator may have an exposure time of 2 ms. Furthermore, in some implementations interleaved read-out may take place. For example, the first charge accumulator may be read-out while the second-charge accumulator acquires a charge.

Alternative Architecture

Figure 5:
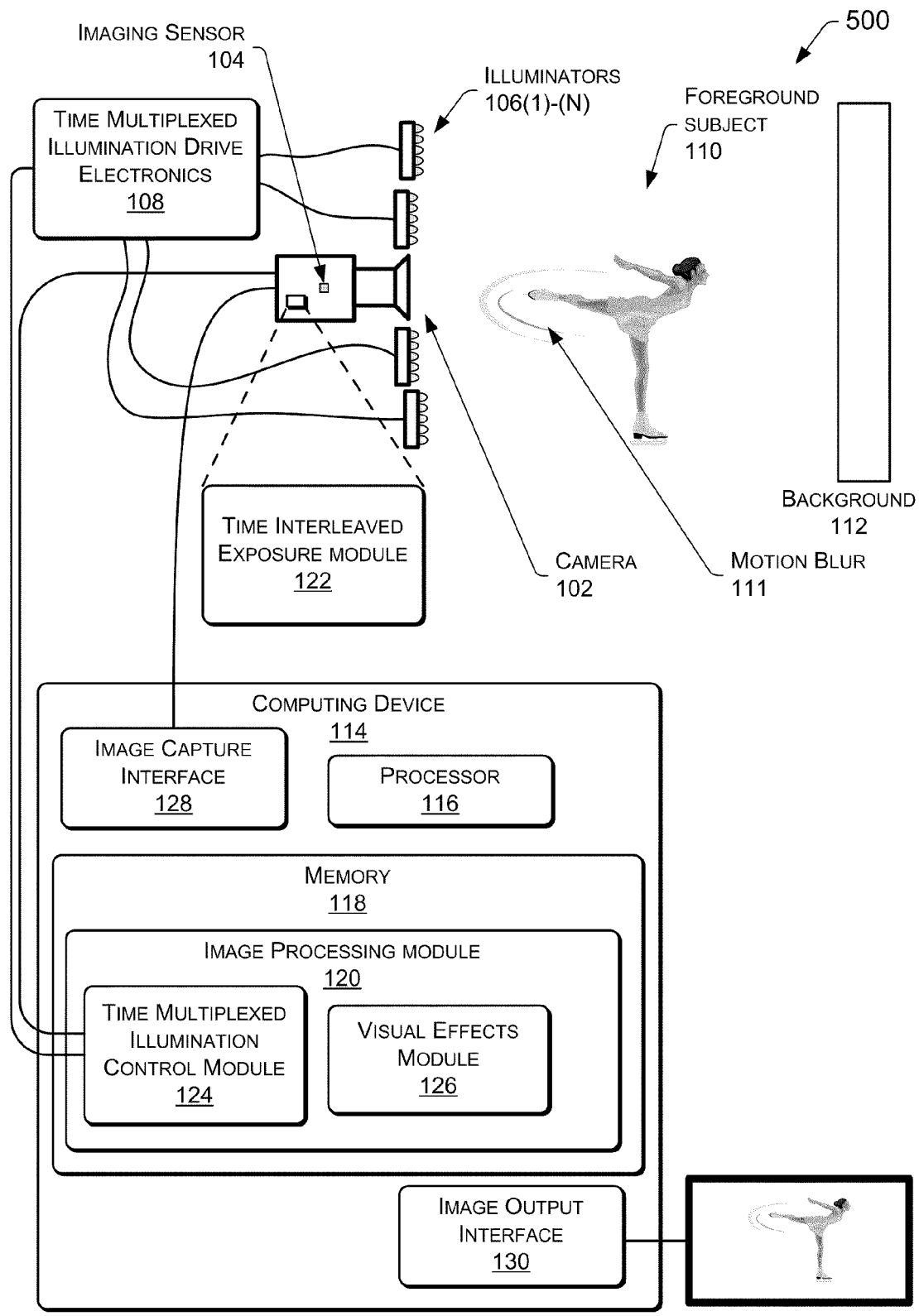
FIG. 5 is an illustrative alternative architecture for time interleaved exposures and time multiplexed illumination where functions of the time interleaved exposure module are incorporated into imaging sensor or camera.

FIG. 5 is an illustrative alternative architecture 500 for time interleaved exposures and time multiplexed illumination. This alternative architecture incorporates the time interleaved exposure module 122 into imaging sensor 104 or camera 102.

As described above with respect to FIG. 2, charge information resulting from each exposure state may be stored in an associated charge accumulator. As the sampling and interleaving rate increases, generation of the exposure computationally resembles a summation. By using the enhanced imaging sensors of FIG. 2 and FIG. 3, the charge accumulates and is equivalent to the summation. Thus, the image is pre-processed in the analog domain, and a rate of output of data from the imaging sensor 104 or camera 102 to the computing device 114 is significantly reduced. For example, with a sample rate of 1000 Hz on a 1 megapixel camera, without pre-processing the data stream is high at 1 billion bits/second, assuming only 1 bit of data per pixel. However, with pre-processing the data may be retrieved at closer to the final frame rate, such as 30 Hz corresponding to 30 frames per second, or 30 megabits/second sent from the imaging sensor 104 or camera 102 to the computing device 114. As a result, lower speed data interfaces may be used, sample rates may be increased, and so forth.

Figure 6:
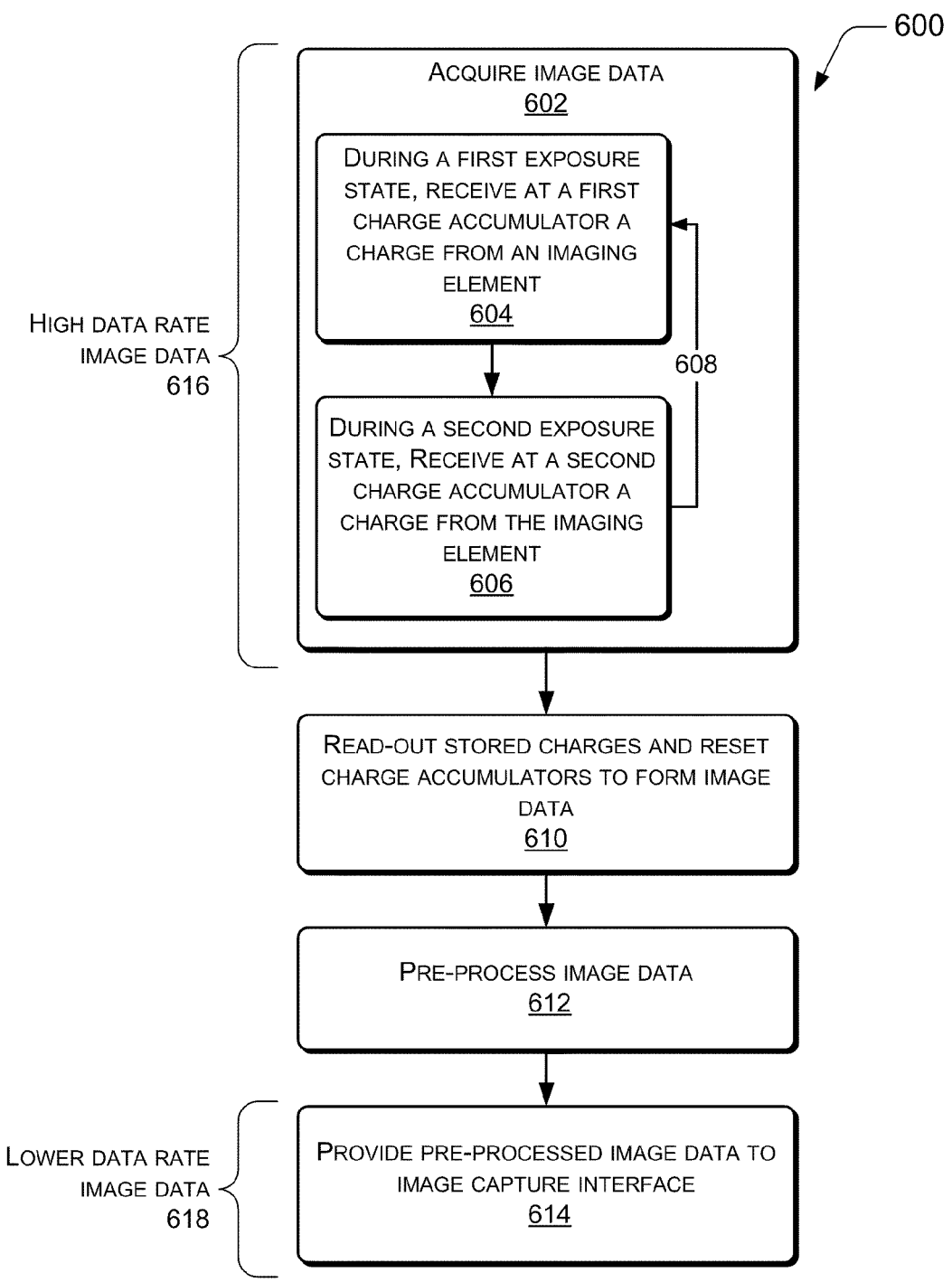
FIG. 6 depicts a flow diagram of an example process of gathering and preprocessing high-speed image data with the imaging sensor of FIG. 2 or 3.

FIG. 6 depicts a flow diagram of an example process 600 of gathering and pre-processing data from the imaging sensor of FIG. 2 or 3. This process may, but need not, be implemented using the architecture shown in FIGS. 1-5 and 7. The process 600 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process will be described in the context of the architecture of FIGS. 1-5, but may be implemented by other architectures.

At 602, image data is acquired. Acquisition includes the rapid transition between states and the capture of each respective exposure state on an accumulator. At 604, during a first exposure state a first charge accumulator receives a charge from an imaging element (or a first imaging element). At 606, during a second exposure state, a second charge accumulator receives a charge from the imaging element (or a second imaging element). The system may alternate between these two states many times as indicated with arrow 608. At 610, a controller reads out the stored charges and resets the charge accumulators to form image data. At 12, image data is pre-processed. This pre-processing may comprise pre-processing the signal in the digital or analog domain. For example, pre-processing in the digital domain may comprise applying data compression to the image data. Pre-processing in the analog domain may comprise the accumulation of the charges in a capacitor over a series of the same exposure states. Given a sufficient sample rate, generating the exposure data resembles a summation. Thus, having each accumulator store the analog charges from the series of the same exposure states is equivalent to a digital summation operation.

In some implementations, such as the analog example given above, the preprocessing 612 may effectively occur during the storage and readout operations.

At 614, the pre-processed image data is provided to the image capture interface. As shown here, the high data rate image data 616 occurs during blocks 602-606 above. Once the pre-processing takes place, as shown at 618, data rate of the image data is lower due to the reduction in data resulting from the pre-processing.

Alternative Architecture, Time Multiplexed Variable Element

Figure 7:
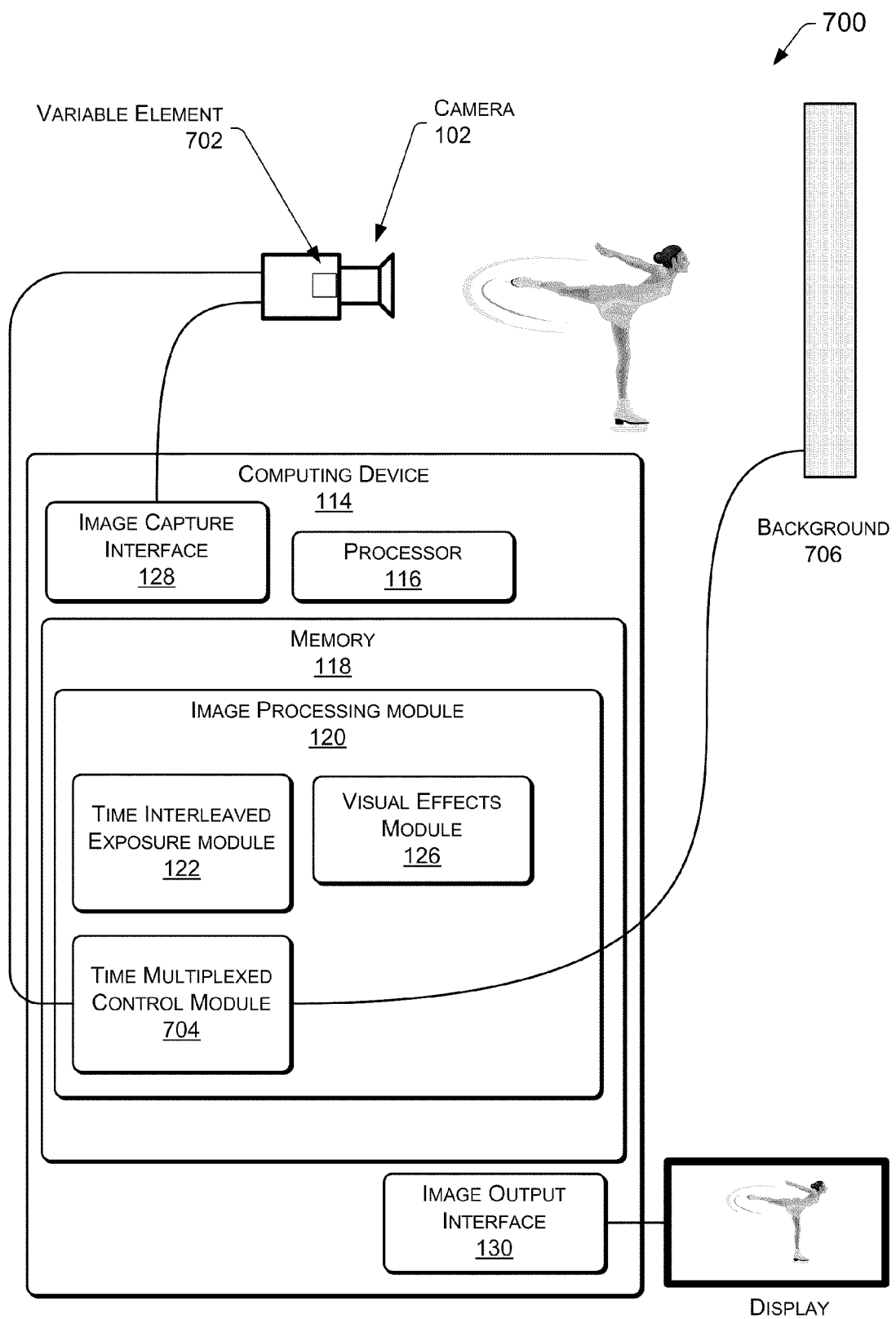
FIG. 7 is an illustrative alternative architecture for time interleaved and time multiplexed image acquisition.

FIG. 7 is an illustrative alternative architecture 700 for time interleaved and time multiplexed image acquisition. While the above discussion has described the varying state as one of illumination, other conditions may be varied among several states. For example, focal length, aperture, background characteristics such as color or opacity, and so forth may also be varied.

FIG. 7 illustrates is a camera 102 with a variable element 702. This variable element may comprise an optical assembly configured to vary focal length, aperture, and so forth at a rate suitable for interleaving. Similar to the architecture of FIG. 1, the camera 102 with the variable element 702 couples to the image capture interface 128. The camera 102 couples to a time multiplexed control module 704, configured to synchronize the variable element 702 with the image sampling. In some implementations the background 706 may be variable. For example, the background 706 may comprise a material capable of altering color, opacity, and so forth at a rate compatible with the sample rate. In some implementations a combination of static and variable backgrounds may be employed. For example, a static background illuminated as described above with respect to FIG. 1 may incorporate a dynamic component.

Time Multiplexing and Sampling of a Varying State

Figure 8:
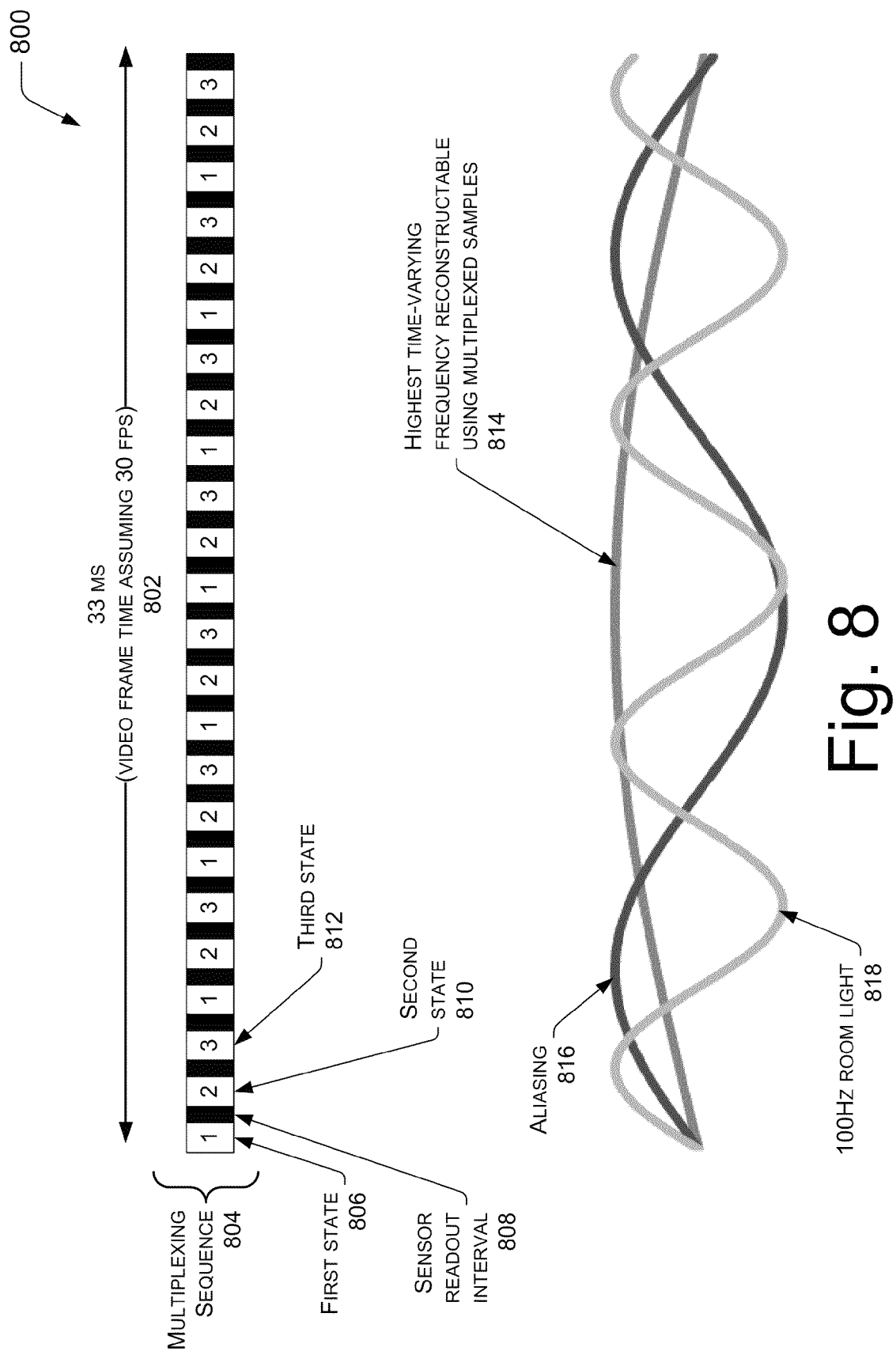
FIG. 8 illustrates a time multiplexed illumination sequence.

FIG. 8 illustrates a time multiplexing sequence 800. As described above, images are sampled in synchronization with two or more varying states such as illumination, aperture, depth of focus, and so forth. An image with desired characteristics is reconstructed from those samples.

Conventional imaging systems use a comparatively slow sample rate. As shown in this illustration, conventional video samples 30 frames per second (fps) 802. Thus, in the illustration, each conventional frame spans up to 33 ms of time. In other implementations, other sample rates may be used, for example 24 fps.

Conventional time-multiplexed illumination systems sample two or more varying states in order to synthesize a video frame. Each state is sampled at most once per synthesized output video frame.

In contrast, the techniques described herein sample two or more varying states many times during the interval of a single frame in conventional systems. For convenience in explanation, but not by way of limitation, the following examples assume that the varying condition is illumination varied among a plurality of states.

This example depicts a multiplexing sequence 804 sampling three states. In other implementations, two or more states may be sampled. In this multiplexing sequence a first state 806 of a first illumination state is sampled, followed by a sensor readout interval 808 of the data from the first illumination state. A second state 810 of a second illumination state is then sampled, followed by another sensor readout interval 808. A third state 812 of a third illumination state is sampled next, followed by another sensor readout interval 808. A sub-sequence of sampling the first, second, and third states may then repeat, until imaging is concluded. As shown here, there are eight sub-sequences of three different states. Thus, out of a total of 24 samples, there are eight samples available for each state. In this illustration, the time for each state sample and sensor readout interval is about 1.38 ms, or equivalent to a sample rate of about 725 Hz. In some implementations the sample rate may be increased or decreased as required to facilitate reconstruction for a given scene and avoid aliasing.

This illustration also depicts, below the multiplexing sequence 804, a set of sine waves, aligned for the same interval of time. A curve shows the highest time-varying frequency re-constructible using the multiplexed illumination samples 814. This indicates that it is possible to accurately reconstruct the sample which would have been captured during the slower single frame. Higher frequencies, such as shown by curve 816 would result in aliasing of the signal. A sine wave 818 illustrating a 100 Hz oscillation of fluorescent/incandescent powered by a power supply frequency of 50 Hz is also shown.

Capturing samples at a high frequency, such as shown by multiplexing sequence 804, realizes several advantages. First, the summation of the samples to produce a resulting image is computationally manageable in real-time. Thus, the techniques described are applicable to real-time video production. Second, it is possible to compensate for varying ambient conditions, such as illumination oscillations resulting from traditional room lights, flicker resulting from computer displays present in the scene, and so forth.

FIGS. 9, 11, 12, and 16 illustrate example processes 900, 1100, 1200, and 1600 that may be implemented by the architecture of FIGS. 1-7 or by other architectures. These processes are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

Figure 9:
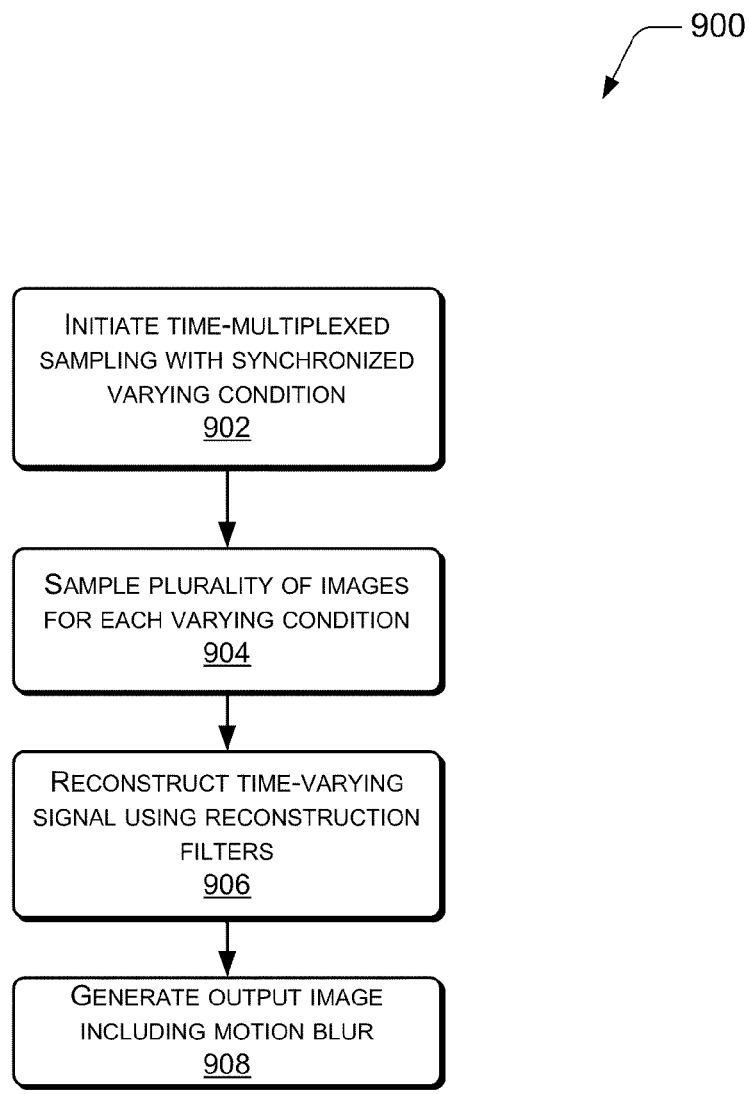
FIG. 9 depicts a flow diagram of an example process of time multiplexed illumination to generate an output image including motion blur.

FIG. 9 depicts a flow diagram of an example process 900 of time multiplexing varying states to generate one output image per state. If the scene is moving, the motion blur in all images will be the same. As described above, inclusion of naturalistic motion blur provides for a more realistic output image, and is thus desirable to avoid unpleasant imaging byproducts such as stroboscopic effects. Moreover, it also allows the use of techniques like matting and relighting despite a moving scene.

At 902, time multiplexed sampling is initiated with a plurality of synchronized varying states. These varying states may include changes to conditions in the imaging system such as include aperture, depth of field, focal length, illumination, and so forth. For example, the varying states may be different lighting states, such as a flash condition and a no-flash state.

At 904, a plurality of images for each varying state is sampled. For example, as described above with regards to FIG. 8, a sample for each lighting state is taken in synchronization with each illumination state.

At 906, a time-varying signal is reconstructed for each state using reconstruction filters. This reconstruction may be used to compute values for the varying state which are desired. For example, continuing the illumination example given above, it is possible to calculate an image with different illumination directions. This allows for relighting and other modifications.

Relighting may be described as follows. Let f(t) be the continuous time-varying irradiance over the area of an imaging element, or pixel. For each frame in a video, the pixel intensity value is the integral of the irradiance over the frame exposure time:

$$I = \int_{t0}^{t1} f(t) \delta t$$

For active illumination, it is desirable to capture these exposures simultaneously for n different illumination states. Let $f_n(t)$ be the time-varying irradiance of a pixel for the scene illuminated continuously by illumination n. It becomes useful to determine the pixel value for a pixel exposed for the frame duration:

$$I = \int_{t0}^{t1} f(t) \delta t$$

While not possible to simultaneously capture the same scene under different illuminations, as described herein it is possible to sample a series of images of the same scene under different states, reconstruct the continuous pixel irradiance, and compute the integral over the frame exposure time. A sampled scene irradiance is denoted $\hat{f}_n(t)$. Samples are taken by illuminating the scene with illumination n and imaging the scene. It is assumed that these exposures are very short and are effectively point samples. Sampling theory indicates that if the $f_n(t)$ are band-limited with no frequency components over some frequency $f_H$, then it is possible to reconstruct them perfectly when sampled at over the Nyquist frequency $2f_H$. The signals may then be reconstructed using a sinc reconstruction filter g(t) with cutoff frequency $f_H$. Thus, $$f_{rn}(t) = \sum_{-\infty}^{+\infty} \hat{f}_n(\tau)g(t-\tau)$$

A reconstructed frame exposure is computed by integrating this reconstructed function over the frame exposure time:

$$I_{rn} = \int_{t0}^{t1} f_{rn}(t) \delta t$$

The above represents an ideal case, with infinite sinc reconstruction filters and other idealized assumptions. In practice, the exposure is computed numerically by summing samples over some window of time. For simplicity, and not by way of limitation, assume the lighting states are all sampled at the same rate. The samples for the states are interleaved, meaning they are offset by a fixed time $\Delta T = 1/(nf_H)$. The reconstructed signals are resampled to generate n temporally aligned sample sequences, which are then summed over the exposure time to compute the exposures for each lighting condition.

The scene content and illumination may constrain the minimum desired sampling rate for time multiplexed illumination. Thus, practical concerns and noise performance limit the maximum sampling rate, particularly in the situation where an image sensor with a single charge accumulator is used. It may be assumed that each image exposure is accompanied by a gap time $T_g$ during which no light is integrated. This includes, for example, the time to reset the imaging elements in each pixel. For time-interleaved illumination, samples of each of the n lighting states are taken k times during the frame exposure time $T_f$, thus the duration of each exposure is $t_I = (T_f/nk) - T_g$. This gap time limits k to $k < T_f/(nT_g)$. When an image sensor with multiple accumulators is used, such as depicted in FIGS. 2 and 3, the signal to noise ratio is improved due to the increased accumulated time.

Noise considerations also limit the maximum sampling rate. To analyze noise, assume a mean signal of S photons per second and consider the following independent noise sources:

$N_S$, Shot Noise. Shot noise arises from the variation in photon emission during a given exposure. It is Poisson distributed, but assuming a large enough number of photons, it can be approximated by zero-mean Gaussian noise source with variance equal to the mean signal (e.g. average pixel in intensity).

$N_D$, Dark shot noise. Dark current is a small current at each pixel even in the absence of light, caused by thermal generation of hole/election pairs at the imaging element. This current also exhibits shot noise, which we represent with variance γt.

$N_R$, Read noise. Read noise is associated with each signal measurement and is modeled as zero-mean Gaussian white noise with variance v.

A signal-to-noise ratio (SNR) for each time-interleaved exposure is:

$$SNR_I = St_I / \sqrt{St_I + \gamma t_I + v}$$

A sum of k exposures for each illumination condition is made. For simplicity, assume uniform weighting, so the mean signal and noise powers add:

$$SNR_I = kSt_I / \sqrt{kSt_I + k\gamma t_I + kv}$$

This equation shows two ways in which noise performance decreases with sampling rate. First, the effective exposure time for a given lighting condition is $kt_I$, which decreases as k increases because of the repeated gap times. This reduces the mean signal for time interleaved exposure and therefore the SNR relative to shot and dark noise. Second, the standard deviation of the summed read noises increases as $\sqrt{k}$, decreasing the SNR even more. When an image sensor with multiple accumulators is used, such as depicted in FIGS. 2 and 3, the signal to noise ratio is improved because there is only a single readout instead of many, greatly reducing readout noise.

For reference, a comparison of the SNR of the reconstructed time interleaved illumination exposure with a single time multiplexed illumination exposure is possible. For time multiplexed illumination, assume that in a given frame time $T_f$ n different illumination states are captured. For time-multiplexed illumination, take n images over each frame time $T_f$, so each exposure duration is $t_M = (T_f/n) - T_g$. The SNR for the time multiplexed illumination exposure is thus:

$$SNR_M = St_M / \sqrt{St_M + \gamma t_M + v}$$

The data from time multiplexed illumination and time interleaved illumination may be used differently. For example, the exposure time for time multiplexed illumination may be reduced to prevent motion blur, also reducing the SNR.

At 908, an output image is generated from the reconstructed time-varying signal. As described above, this output image includes naturalistic motion blur.

Flash/No-Flash Segmentation

Figure 10:
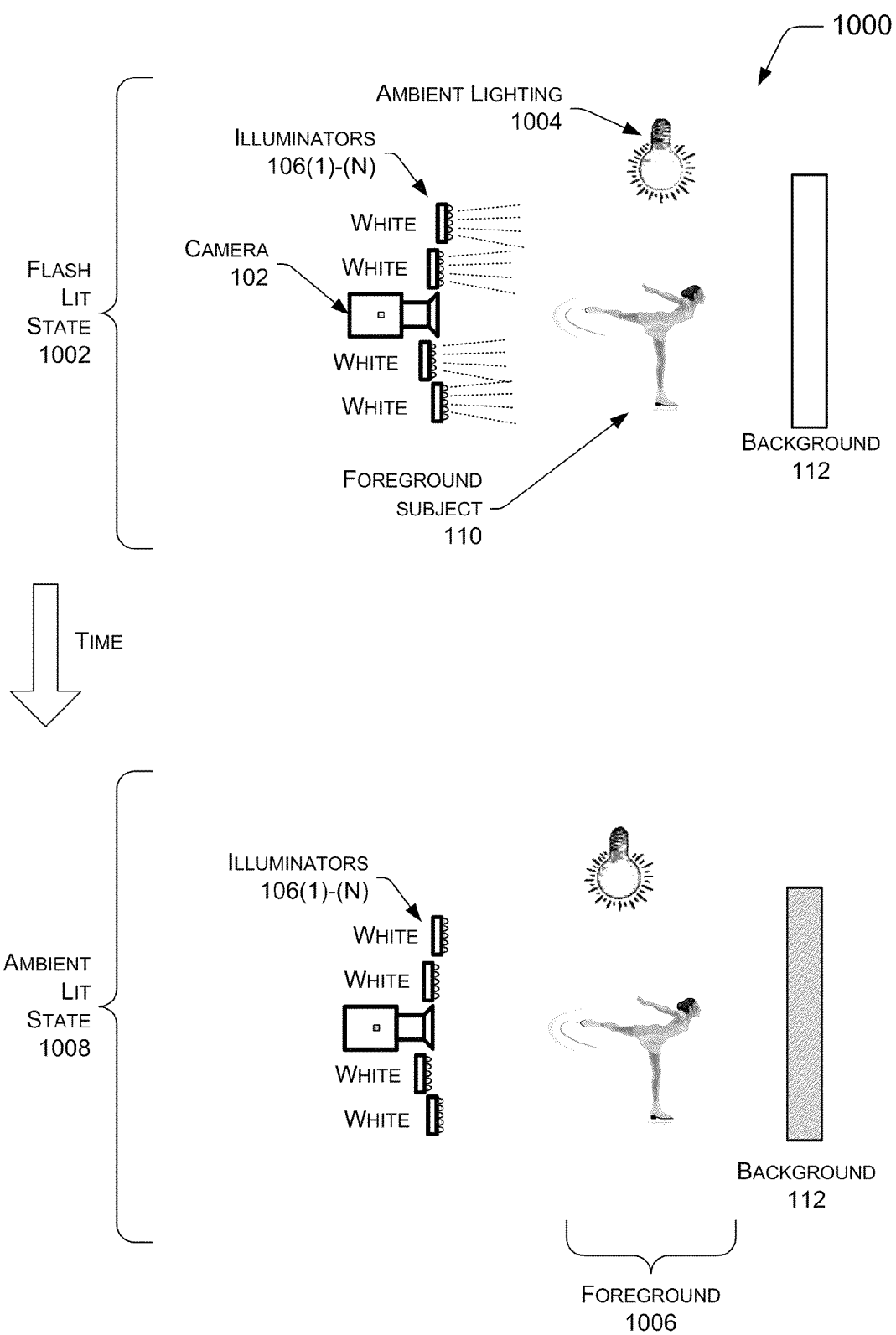
FIG. 10 illustrates a series of lighting states captured for scene relighting.

FIG. 10 illustrates a series of lighting states 1000 captured for scene relighting or flash/no-flash segmentation. It may be desirable to relight a scene to match an artistic preference, lighting shown in a virtual environment to which the scene or a portion thereof will be composited, and so forth. Flash/no-flash segmentation is discussed below with regards to FIG. 12.

Shown is a first flash lit state 1002 at a first moment in time. Ambient lighting 1004, such as a room light, is shown along with a foreground subject 110 in a foreground 1006 zone and in front of a background 112. The camera 102 and the illuminators 106(1)-(N) are also depicted. The illuminators in this state provide white light, and are all active during the flash lit state 1002. During this state, a sample is taken with camera 102 during this lighting condition.

Shown next is an ambient lit state 1008. In this state, the ambient lighting 1004 remains on, but illumination from the illuminators 106(1)-(N) has been discontinued. Thus, the background 112 and the foreground subject 110 are relatively darker than when illuminated during the flash lit state. During this state, another sample is taken with camera 102, storing the image with this lighting condition.

Computation of normals and reflectances of illumination for each color channel occurs, and each channel may be fit to a Lambertian reflectance model, as described below with regards to FIG. 11. A desired exposure may then be computed, and the relit scene, including motion blue, is generated.

Relighting

Figure 11:
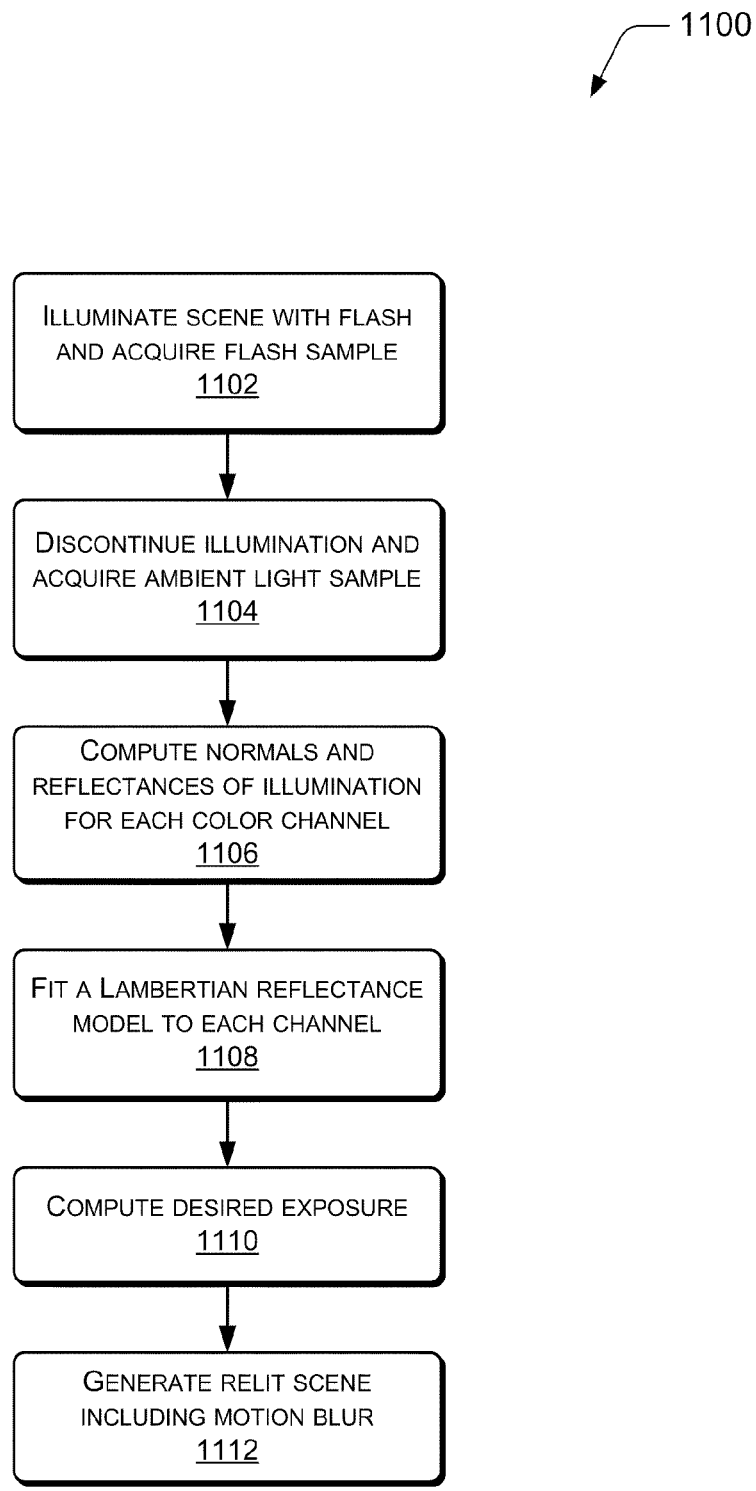
FIG. 11 depicts a flow diagram of an example process of relighting a scene using captured lighting states such as those of FIG. 10.

FIG. 11 depicts a flow diagram of an example process 1100 of relighting a scene using captured lighting states such as those of FIG. 10. At 1102 a scene is illuminated with a flash, and a flash sample is acquired. At 1104, illumination is discontinued and an ambient light sample is acquired. As described above with respect to FIG. 8, this interleaving of states and the corresponding synchronization of illumination occurs at a desired sampling rate.

At 1106, normals and reflectances of illumination are computed for each color channel. For discussion purposes, consider a simple relighting scenario, that of two Lambertian surfaces $S_1$ and $S_2$ with unit surface normals $\vec{n}_1$ and $\vec{n}_2$ and reflectances $\rho_1$ and $\rho_2$, respectively. Assume the surface is illuminated by a light from direction $\vec{l}$ with intensity $\|\vec{l}\|$.

Motion blur is introduced by a pixel viewing one surface for some fraction α of the exposure time and the other surface for a fraction 1−α of the exposure. This blend could occur because one surface is moving in front of another, or because the two are physically adjacent and their image is moving across a sensor plane. The irradiance at the pixel is then:

$$I=\alpha\rho_1\max(\vec{n}_1\cdot\vec{l},0)+(1-\alpha)\rho_2\max(\vec{n}_2\cdot\vec{l},0)$$

If neither surface is self-shaded ($\vec{n}_1\cdot\vec{l}>0$ for both surface), then the irradiance equation may be rewritten as:

$$I=(\alpha\rho_1\vec{n}_1+(1-\alpha)\rho_2\vec{n}_2)\cdot\vec{l}=\acute{\rho}\vec{\acute{n}}\cdot\vec{l},$$

where $$\acute{\rho}=\|\alpha\rho_1\vec{n}_1+(1-\alpha)\rho_2\vec{n}_2\|\text{ and }$$

$$\vec{\acute{n}}=(\alpha\rho_1\vec{n}_1+(1-\alpha)\rho_2\vec{n}_2)/\acute{\rho}.$$

Thus, barring shadows, the irradiance may be represented as $I=\acute{\rho}\vec{\acute{n}}\cdot\vec{l}$, as if there were a single surface with normal $\vec{\acute{n}}$ and reflectance $\acute{\rho}$. These values may be determined using photometric stereo techniques. For color images, the normals and reflectances are computed separately for each color channel (red, green and blue), yielding three normals $\vec{\acute{n}}_r, \vec{\acute{n}}_g, \vec{\acute{n}}_b$ and three reflectances $\acute{\rho}_r, \acute{\rho}_g, \acute{\rho}_b$.

By fitting a Lambertian reflectance model to each color channel separately, it becomes possible to relight motion blur between two Lambertian surfaces. In one implementation, motion blurred exposures are captured with at least three different non-planar lighting directions, however more illuminators and more sophisticated reflectance models may also be used. Thus, given the techniques described above, it is now possible to directly relight motion-blurred video, in a computationally efficient fashion suitable for real-time video.

Additionally, virtual spotlights may be added to a scene. Studio lights are often very bright to create a certain lighting effect (e.g. lit from the front). With time interleaved exposures, it is possible to interleave ambient lighting and interleaved spotlights, and virtually increase the spotlight brightness. This allows for use of dimmer lights in the studio, which is more comfortable for the actors, consumes less energy, and generates less heat.

Figure 12:
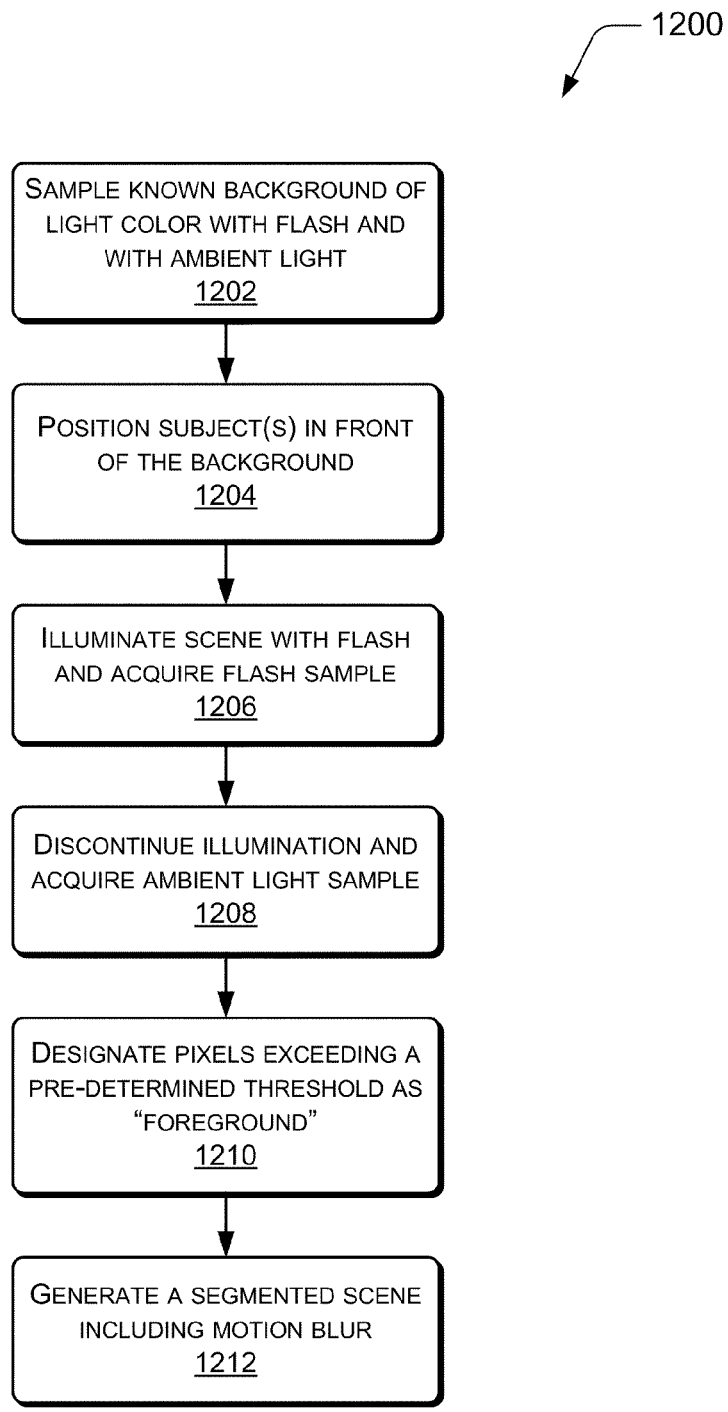
FIG. 12 depicts a flow diagram of an example process of flash/no-flash segmentation to determine foreground and background objects in a scene using captured lighting states such as those of FIG. 10.

FIG. 12 depicts a flow diagram of an example process 1200 of flash/no flash segmentation to determine foreground and background objects in a scene using captured lighting states such as those of FIG. 10.

As described above with regards to FIG. 10, it is possible to sample images in a flash and no-flash state. Where the background is a known, lighter color, it is possible to segment foreground objects from the background. Dark areas are unambiguous because they cannot match the light background, while light areas will appear brighter when illuminated during the flash lit state. To address surfaces which may not show a sufficient intensity increase, additional multiple flashes may be arranged around the camera 102.

At 1202, a known background of light color is sampled with flash lit and in a non-flash lit (ambient) state. A mean $\mu_A$ and variance $\rho_A$ at each pixel for an exposure $B_A$ of the light background under ambient lighting is determined. Means and variances at each pixel for exposures $B_1$, $B_2$ during the flash lit states are also calculated yielding the means $\mu_i$ and variance $\sigma_i$.

At 1204, subjects may be positioned in the foreground in front of the background. In some implementations, the background may be sampled while the subjects are in the foreground.

At 1206, the scene is illuminated with a flash lit state and a flash sample is acquired. At 1208, the illumination is discontinued and an ambient light sample is acquired.

At 1210, pixels with values exceeding a pre-determined threshold are designated as "foreground" pixels, while the remainder as designated as "background" pixels using the means and variances described above. To segment a foreground subject in front of the background, the series of exposures $F_A$, $F_1$, $F_2$, . . . of the subject as lit with and without the flash are compared. Foreground pixels are any pixel for which $|F_A-\mu_A|$ is over a threshold (for example, $5\sigma_A$). Unlabeled pixels for which $(F_i-B_i)$ is greater than a threshold (for example, $5\sigma_i$ for any i), are also labeled as foreground. Thus, the pixels which are in the foreground and background are determined.

At 1212, a segmented scene including natural motion blur, is generated. Matting and compositing operations, among others, may take advantage of this segmented scene. For example, "background" pixels may be removed from an image and replaced during compositing with another image. This technique may also be used for flash/no-flash image denoising, highlight removal, red-eye removal, and so forth.

Interleaved Chroma Key

Figure 13:
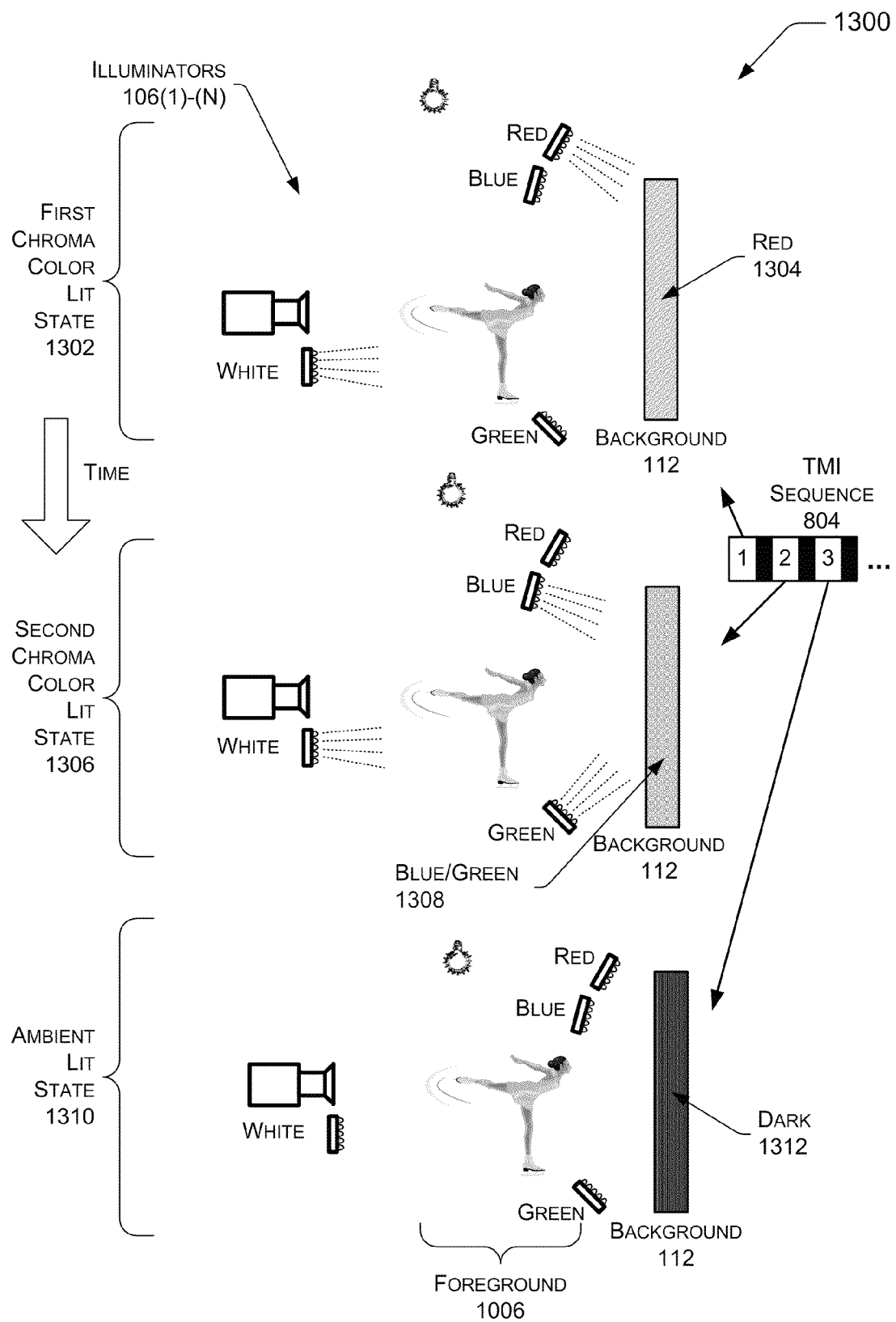
FIG. 13 illustrates a series of lighting states captured for interleaved chroma keying.

FIG. 13 illustrates a time series 1300 of three lighting states captured for interleaved chroma keying. Interleaved chroma keying involves the capture of samples under different illumination states comprising different colors of illumination. This interleaved chroma key may then be used to generate an alpha matte, suitable for compositing or insertion of other visual effects.

A first chroma color lit state 1302 is provided and captured. As shown here, red and white illuminators 106 are active. The white light illuminates the foreground 1006 subjects, while the red light illuminates the background 112, rendering it red (or reddish) 1304, and a sample is acquired.

A second chroma color lit state 1306 is provided and captured. In this second chroma color lit state, blue, green, and white illuminators are active. The white light illuminates the foreground 1006 subjects and the blue and green lights illuminate the background 112 to a blue/green color 1308, and a sample is acquired.

A third state, that of an ambient lit state 1310 is also captured. All of the illuminators are dark, and an image is acquired. The background 112 is now dark 1312. By adding an interleaved ambient lighting exposure, the technique described herein becomes robust to changes in ambient illumination (for example, flicker in fluorescent lighting). The ambient exposure may be subtracted from a known backing image and from the images taken with the subject in the foreground 1006. For each frame, subtracting the ambient illumination from the exposures with the ambient illumination plus the background lighting leaves only the illuminated background, occluded or not by the subjected, so an alpha matte is computable.

Figure 14:
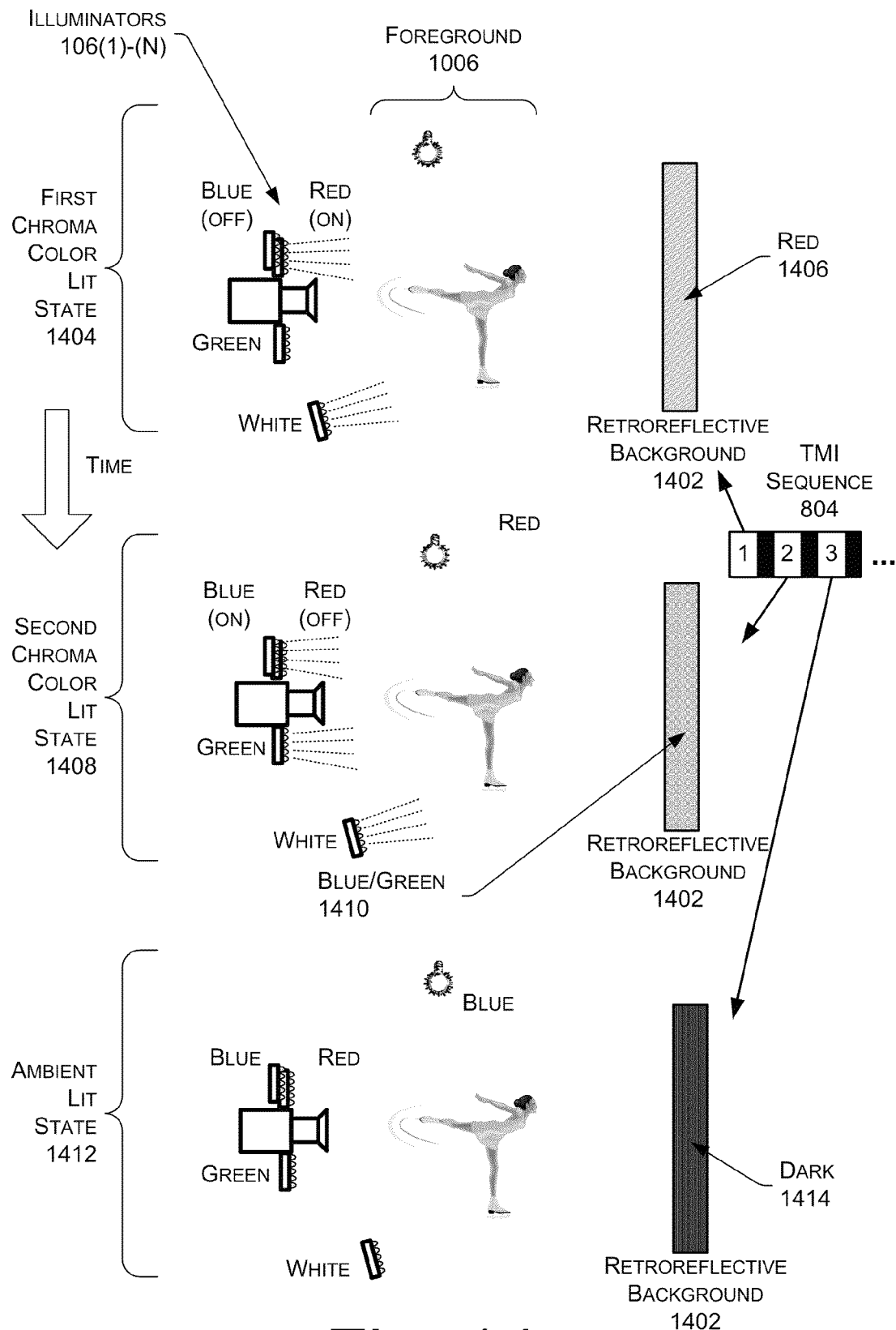
FIG. 14 illustrates a series of lighting states captured for interleaved chroma keying using an alternate arrangement of illuminators to illuminate a foreground and a retroreflective background.

FIG. 14 illustrates a series of lighting states 1400 captured for interleaved chroma keying using an alternate arrangement of illuminators to illuminate a foreground and a retroreflective background 1402. In this arrangement, separate colored illuminators are provided to light the foreground as well as the background. The colored illuminators are arranged close to the optical axis of the camera 102 to reduce or eliminate shadows visible to the camera 102 while the white light is disposed at another location to illuminate the foreground. For example, they may be disposed in a ring around the camera 102 lens.

Similar to the series of lighting states described above with respect to FIG. 13, a first chroma color lit state 1404 is provided and captured. As shown here, red and white illuminators are active. The red light is reflected back to the camera to a much lesser degree by foreground objects than by the retroreflective background 1402. Thus, the retroreflective background 1402 appears red (or reddish) 1406, while the white light illuminates the subject in the foreground 1006, and a sample acquired. It is useful to consider the path of the light rays in this situation. Because the light rays incident on the retroreflective background 1402 are reflected back to the source, light from the colored illuminators is reflected back towards them, and thus to the camera which they are proximate to. Likewise, light from the white light illuminator incident upon the retroreflective background 1402 is reflected back towards the white light illuminator, which is positioned away from the camera.

A second chroma color lit state 1408 is provided and captured. In this second chroma color lit state, the blue, green, and white illuminators are active. The blue, green, and white lights color the retroreflective background 1402 to a blue/green color 1410, while the white light illuminates the subject in the foreground 1006, and a sample is acquired.

A third state, that of an ambient lit state 1412 is also captured. All illuminators are discontinued, and an image is acquired. The foreground 1006 and the retroreflective background 1402 are now dark 1414.

As described above, FIGS. 13 and 14 depict two of many possible implementations, and are shown by way of illustration and not limitation. For example, in some implementations the ambient illumination frames may be skipped such as in situations where there is no varying ambient illumination, such as outdoors under steady sunlight.

Figure 15:
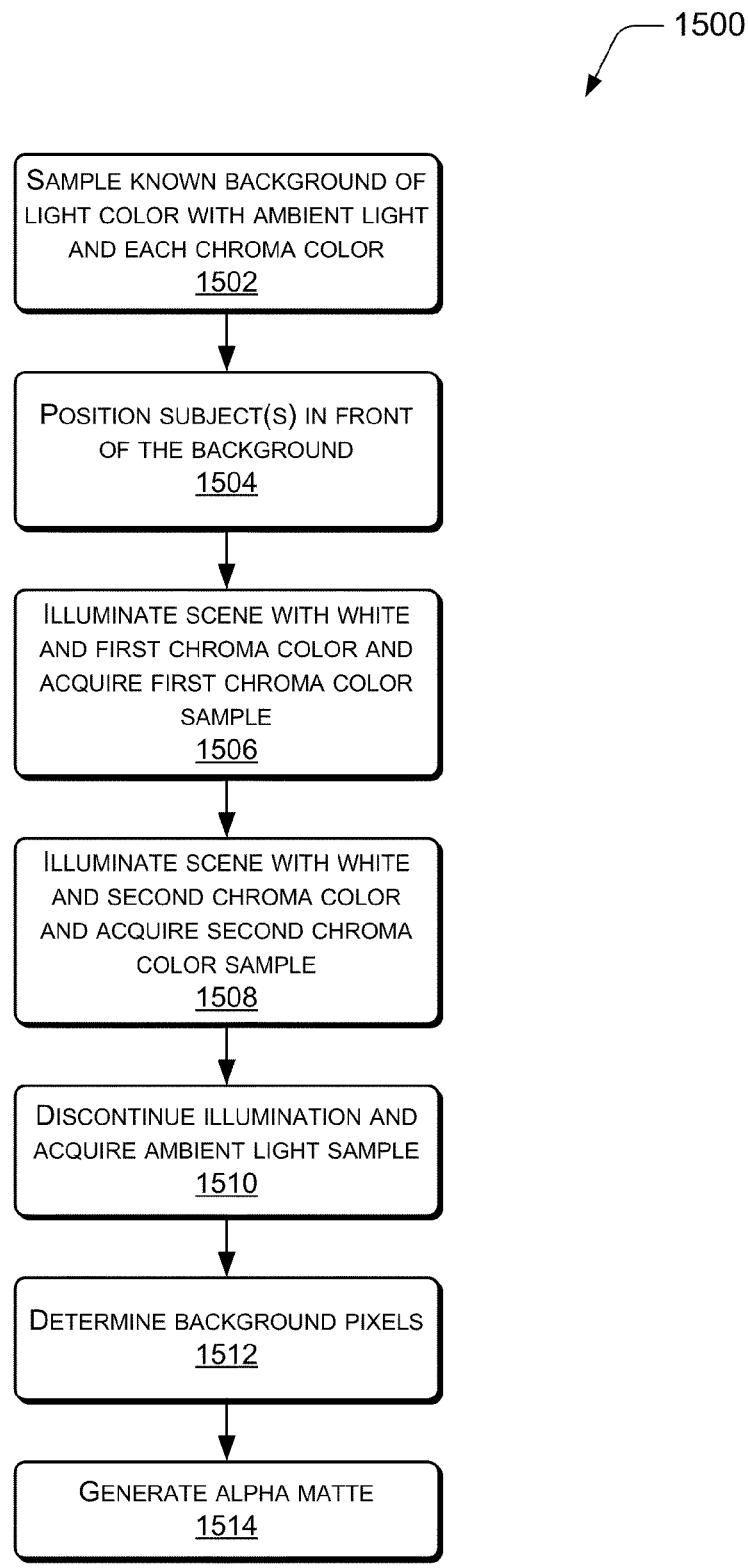
FIG. 15 depicts a flow diagram of an example process of interleaved chroma keying to generate an alpha matte.

FIG. 15 depicts a flow diagram of an example process 1500 of interleaved chroma keying to generate an alpha matte. At 1502, samples of a known background are taken with ambient light and each of the interleaved chroma key colors. In some implementations, this known background may be of a light color.

At 1504, the subject is positioned in front of the background. At 1506, a white light and a first chroma color light illuminate the scene, and the camera acquires a first chroma color sample.

At 1508, a white light and a second chroma color light illuminate the scene, and the camera acquires a second chroma color sample. At 1510, the illumination is discontinued and the camera acquires an ambient light sample.

At 1512, background pixels are determined based at least in part upon their consistent variation in response to the varying illumination. At 1514, an alpha matte is generated based at least in part upon this determination of which pixels are background pixels. The resulting alpha matte may then be used for compositing with another image, or other special effects.

Interleaved chroma keying may be simultaneously combined with video relighting and other techniques described herein. Thus, an image may be processed to allow for alpha matting and relighting.

CONCLUSION

Although specific details of illustrative methods are described with regard to the figures and other flow diagrams presented herein, it should be understood that certain acts shown in the figures need not be performed in the order described, and may be modified, and/or may be omitted entirely, depending on the circumstances. As described in this application, modules and engines may be implemented using software, hardware, firmware, or a combination of these.

Moreover, the acts and methods described may be implemented by a computer, processor or other computing device based on instructions stored on memory, the memory comprising one or more computer-readable storage media (CRSM).

The CRSM may be any available physical media accessible by a computing device to implement the instructions stored thereon. CRSM may include, but is not limited to, random access memory (RAM), read-only memory (ROM), electrically erasable programmable read-only memory (EEPROM), flash memory or other solid-state memory technology, compact disk read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by a computing device.

What is claimed is:

1. One or more computer-readable storage devices storing instructions that, when executed by a processor, cause the processor to perform acts comprising:
    illuminating a portion of a scene with different interleaved lighting states, wherein each of a plurality of the different interleaved lighting states illuminates the portion of the scene a plurality of times, and wherein a same portion of the scene is illuminated by each of the plurality of the different interleaved lighting states;
    collecting data from the scene with an image sensor comprising a plurality of pixels, the data corresponding to each of the different interleaved lighting states;
    reconstructing a time-varying signal from the data using a reconstruction filter, the reconstructing based at least in part on data collected from a plurality of times during which the scene is illuminated with a particular interleaved lighting state; and
    generating, based at least in part upon the reconstructed time-varying signal, an output image of the scene including motion blur for each of the plurality of different interleaved lighting states.

2. The one or more computer-readable storage devices of claim 1, wherein reconstructing the time-varying signal using the reconstruction filter comprises determining a weighted sum of pixel values for the collected data of interleaved lighting states over a pre-determined amount of time.

3. The one or more computer-readable storage devices of claim 1, wherein the different interleaved lighting states comprise an ambient light state and a state that includes illumination from one or more illuminators.

4. The one or more computer-readable storage devices of claim 3, wherein the state that includes illumination from one or more illuminators comprises monochromatic illuminations.

5. The one or more computer-readable storage devices of claim 1, wherein the illuminating comprises cycling the plurality of the different interleaved lighting states a plurality of times at a rate of at least about 100 times per second.

6. A system comprising:
    an imaging device comprising a plurality of pixels;
    an illuminator; and
    a computing device coupled to the imaging device and the illuminator and configured to:
    cycle illumination of a portion of a scene between pre-determined illumination states a plurality of times at a rate of at least about 100 times per second, wherein the portion of the scene is illuminated with each of a plurality of the pre-determined illumination states a plurality of times, and wherein a same portion of the scene is illuminated with each of the plurality of the pre-determined illumination states;

synchronize with the plurality of pre-determined illumination states and sample at least a portion of the plurality of pixels during at least a portion of the pre-determined illumination states to create a plurality of samples; and reconstruct a time-varying signal from the plurality of samples.

7. The system of claim 6, wherein the reconstruction comprises a summation of at least a portion of the plurality of samples from same illumination states.

8. The system of claim 6, wherein the imaging device is analog and configured to pre-process image data and output low-speed image data.

9. The system of claim 6, wherein the plurality of pixels comprise imaging elements configured to be alternatively and selectively coupled to a first charge accumulator or a second charge accumulator, and each of the plurality of samples comprises a charge stored in one of the first or second charge accumulators and read out by the imaging device after a plurality of alternations.

10. The system of claim 6, wherein the plurality of pixels each comprise a first imaging element coupled alternately between a first charge accumulator and a second imaging element coupled to a second charge accumulator, and each of the plurality of samples comprises a charge stored in one of the first or second charge accumulators and read out by the imaging device after a plurality of alternations.

11. The system of claim 6, wherein the illuminator is configured to generate a plurality of different colors and each of the plurality of pre-determined illumination states comprise monochromatic illumination.

12. A method comprising:
generating interleaved image data of a scene, the generating comprising:
imaging the scene with a plurality of interleaved states, the scene being imaged a plurality of times in each of at least two of a plurality of lighting states;
sampling pixels in an imaging device to acquire state data associated with the each of the plurality of interleaved states; and
calculating an image based at least in part upon the generated interleaved image data, wherein the calculating the image comprises:
computing normals and reflectances for individual color channels; and
fitting a reflectance model to the individual color channels.

13. The method of claim 12, wherein the imaging the scene with the plurality of the interleaved states comprises varying an aperture of the imaging device.

14. The method of claim 12, wherein the imaging the scene with the plurality of the interleaved states comprises varying a color or opacity of a background of the scene.

15. The method of claim 12, wherein the imaging the scene with the plurality of the interleaved states comprises varying a focal length of the imaging device.

16. The method of claim 12, wherein the calculating the image further comprises computing a desired exposure based at least in part upon the fitting.

17. The method of claim 12, wherein the calculating comprises computing a desired exposure to relight the scene.

18. The method of claim 12, wherein the plurality of interleaved states comprises a flash state and a no-flash state, and further comprising segmenting the scene into a foreground and a background based at least in part upon one or more pixels exceeding a pre-determined threshold.

19. The method of claim 12, wherein the imaging the scene with the plurality of the interleaved states comprises varying one or more illumination characteristics.

20. The method of claim 19, wherein the one or more illumination characteristics comprise color, duration, intensity, or physical location of one or more illuminators relative to one or more illuminated objects.

21. The method of claim 12, wherein the reflectance model includes a Lambertian reflectance model.

* * * * *